United States Patent
Lefebvre et al.

(10) Patent No.: US 8,807,036 B2
(45) Date of Patent: Aug. 19, 2014

(54) VANADIUM-DRIER INTAGLIO INK

(75) Inventors: Olivier Lefebvre, Lausanne (CH);
Christophe Schaller, Ollon (CH);
Pierre Degott, Crissier (CH); Edgar Müller, Fribourg (CH)

(73) Assignee: Sicpa Holding SA, Prilly (CH)

( * ) Notice: Subject to any disclaimer, the term of this patent is extended or adjusted under 35 U.S.C. 154(b) by 772 days.

(21) Appl. No.: 12/663,570

(22) PCT Filed: Jul. 2, 2008

(86) PCT No.: PCT/EP2008/058520
§ 371 (c)(1),
(2), (4) Date: Dec. 8, 2009

(87) PCT Pub. No.: WO2009/007288
PCT Pub. Date: Jan. 15, 2009

(65) Prior Publication Data
US 2010/0162909 A1    Jul. 1, 2010

(30) Foreign Application Priority Data
Jul. 9, 2007  (EP) .................................. 07112020

(51) Int. Cl.
C09F 9/00 (2006.01)
B41M 3/14 (2006.01)
C09D 11/10 (2014.01)
C09D 11/12 (2006.01)
C09D 11/02 (2014.01)

(52) U.S. Cl.
CPC ................ *C09D 11/107* (2013.01); *B41M 3/14* (2013.01); *C09D 11/105* (2013.01); *C09D 11/12* (2013.01); *C09D 11/03* (2013.01)
USPC ........................................................ 101/491

(58) Field of Classification Search
None
See application file for complete search history.

(56) References Cited

U.S. PATENT DOCUMENTS

| | | | | |
|---|---|---|---|---|
| 4,966,628 A * | 10/1990 | Amon et al. | .................. | 524/555 |
| 5,484,895 A | 1/1996 | Meister et al. | | |
| 5,668,244 A * | 9/1997 | Kawashima et al. | ......... | 528/297 |
| 6,063,841 A * | 5/2000 | Link et al. | ..................... | 523/505 |

FOREIGN PATENT DOCUMENTS

| | | |
|---|---|---|
| DE | 4236697 | 5/1994 |
| EP | 0340163 | 11/1989 |
| EP | 0798320 | 10/1997 |
| EP | 1394230 | 3/2004 |
| EP | 1790701 | 5/2007 |
| WO | WO 0138445 A1 * | 5/2001 |
| WO | 03/093384 | 11/2003 |
| WO | 2004/011165 | 2/2004 |
| WO | 2006/038310 | 4/2006 |

OTHER PUBLICATIONS

Hein, "Driers for Air-Driable Waterborne Coatings"; Double Liaison No. 492-493, 1997, pp. 31-32, OM Group Inc., Cleveland, Ohio, U.S.

(Continued)

*Primary Examiner* — Joshua D Zimmerman
(74) *Attorney, Agent, or Firm* — Greenblum & Bernstein, P.L.C.

(57) ABSTRACT

An oxidatively curing intaglio printing ink is disclosed, comprising an oxidatively curable polymer, an anionic macromolecular surfactant, a wax component, and a salt of vanadium, preferably of the vanadyl ($VO^{2+}$) ion, as the oxypolymerization inducing siccativating agent.

25 Claims, 2 Drawing Sheets

(56) References Cited

OTHER PUBLICATIONS

Rhodes et al., "Vanadium Compounds as Driers for Linseed Oil", The Journal of Industrial and Engineering Chemistry, Mar. 1922, pp. 222-224, vol. 14, No. 3, Department of Chemistry, Cornell University, Ithaca, New York, U.S.

"Driers for Paints and Varnishes", International Standard, ISO 4619, Second Edition, Mar. 15, 1998, Switzerland.

Van Gorkum et al., "The oxidative drying of alkyd catalysed by metal complexes", Coordinated Chemistry Reviews 249, pp. 1709-1728, 2005, Elsevier B.V., The Netherlands.

Swehten, "Die Verwendung von Vanadiumberbindungen zur Herstellung von Sikkativen", pp. 1138-1139.

Hebler, "Vanadinverbindungen als Trockenstoffe", pp. 2077-2078, Hannover.

Römpp Lexikon, Lack and Druckfarben, "Trocknende Öle", p. 583, Ulrich Zorll.

Ullmanns Encyclopädie der Technischen Chemie, "Trocknende Öle", vol. 213, pp. 425-455, Verlag Chemie GmbH, 1983, Weinheim.

* cited by examiner

VANADIUM-DRIER INTAGLIO INK

FIELD OF THE INVENTION

The invention is in the field of printing inks. It concerns an oxidative curing, oil-based printing ink, in particular for the engraved copperplate (Intaglio) printing process, which comprises vanadium as a siccativating agent, used in combination with an anionic macromolecular surfactant.

BACKGROUND OF THE INVENTION

Oxidative curing printing inks are used for printing documents which must last for a long time and withstand adverse environment conditions, such as is the case for banknotes and identity documents. Oxidative curing is particularly useful in printing processes such as the copperplate intaglio and in the offset printing process, which rely on pasty, oil-based inks of high viscosity (3 Pa*s or more).

The copperplate intaglio printing process, which is traditionally employed for banknote printing, is most often performed with oxidative drying, alkyd-resin based inks. The alkyd groups therein are chosen from the unsaturated fatty acids, derived from linseed oil, tung oil, tall oil, as well as from other drying oils having an iodine number of at least 100, as known to the skilled person ("Drying Oils": Römpp Lexikon "Lacke and Druckfarben", 1998, p. 583; Ullmanns Encyclopädie der Technischen Chemie, $4^{th}$ edition, Vol. 23, p. 425 and following).

The said inks must contain a siccativating agent (drier), which is an oxypolymerization catalyst. After exposure of the printed ink to air, the drier reacts with air oxygen, forming free radicals. These radicals, in turn, initiate crosslinking reactions involving the vicinity of the unsaturated positions (carbon-carbon double-bonds) of the alkyd groups.

Said siccativating agent (drier) is traditionally chosen from the group of metal soaps, comprising the salts of long-chain fatty acids with a polyvalent metal, such as cobalt, manganese, calcium, zirconium, and cerium. Salts of the said type are oil-soluble and thus compatible with the oil-based inks in which they are used.

The siccativating agent must comprise a primary siccativating component, which is a metal ion capable of existing, under the conditions of the application, in more than one oxidation state. The ions of the chemical elements with numbers 23 to 29, as well as those of certain other chemical elements, are potentially useful as primary siccativating components. Manganese soaps display a slow drying action, whereas cobalt soaps are known as rapid driers. Mixtures of both are commonly used for obtaining enhanced drying performance.

Soaps of calcium and/or zirconium, as well as of cerium are often added as co-siccativating agents (secondary siccativating components), to even further accelerate the drying process (see DIN ISO 4619 "Trockenstoffe für Beschichtungsstoffe").

Metal compounds of alkylenoxide-containing carboxylates, phosphonates and sulphonates, as drying-time-reducing drying agents for oxidatively drying paints, were disclosed in DE 4 236 697 A1 (Henkel KGaA). Cobalt, manganese, iron, lead, vanadium, cerium, zirconium, calcium, strontium, barium, bismuth, zinc and tin were claimed as the metal component of the drying agent.

Soaps of metals such as lead and zinc have been frequently used in the past as components of the drying agent. The increasing consciousness about environmental issues has led, however, to a ban of these metals from applications in consumable goods. Cobalt might also be banned in the future from such applications for the same reasons.

There is in consequence a strong interest in developing cobalt-free drier systems, which can substitute the traditionally used cobalt containing driers in printing inks and coating compositions. None of the cobalt-free drier systems disclosed in the art has, however, reached the performance of the conventional cobalt containing driers in printing inks.

EP-A-1 394 230 (Dainippon Ink and Chemicals, Inc.) discloses a cobalt-free drier for oxypolymerization-drying printing inks, which is based on a mixture of manganese and cerium fatty acid soaps. WO-A-06/03831 of the same applicant discloses a coating composition wherein part of the drier is replaced by a lipoxidase enzyme. WO-A-03/093384 (ATO B.V., Netherland) discloses drier systems based on manganese and/or iron, whose action is accelerated through the addition of a reducing biomolecule, such as ascorbic acid or its derivatives.

A potential substitute for cobalt in drier compositions is vanadium. This element is omnipresent and relatively abundant in the earth crust (136 ppm; $19^{th}$ most abundant element after zirconium, carbon and sulfur, and before chlorine, chromium and nickel), and is thus not likely to pose a problem if used in consumable goods. This is not the case of cobalt, which is on the one hand an essential trace element (29 ppm; $30^{th}$ most abundant element), but whose bio-available concentration should, on the other hand, be comprised within well-known limits, any excess of this element being toxic to life. Manganese, on the other hand, is abundant and omnipresent in the earth crust (1060 ppm; $12^{th}$ most abundant element), such that it can be used without environmental limitations.

Vanadium compounds have been used as oxidation catalysts and are described as siccativating agents for coating compositions. F. H. Rhodes et al., *The Journal of Industrial and Engineering Chemistry*, Vol. 14, No. 3, p. 222-4 (1922), and R. Swehten, Farben-Zeitung, 32, p. 1138-9 (1927), were the first to report the use of vanadyl resinates and linolates for this purpose. The reported results were challenged, however, by F. Hebler, *Farben-Zeitung*, 32, p. 2077-8 (1927), showing that the indicated vanadium compounds were clear underperformers, compared to the usual cobalt and manganese drying agents. This statement is confirmed by the historical absence, up to now, of vanadium in commercial siccativating agents.

In recent years, the interest in vanadium driers rose again, and comparative tests performed by R. W. Hein, *Double Liaison Physique, Chimie et Economie des Peintures et Adhésifs, No.* 492-493, p. 31-2, showed that vanadium soaps can indeed be used as siccativating agents for emulsifiable alkyd resins; the reported comparative drying speeds were as follows: Co/Mn: 5 hours; V: 12 hours; V/Mn: 8 hours; V/Co: 4 hours. The drying was reported to further depend on the presence of drying accelerators, such as bipyridine, which was used in all tests.

Recently, special vanadium compounds were disclosed in U.S. Pat. No. 6,063,841 (Link et al.; Borchers GmbH) as siccativating agents for oxidatively drying, water containing lacquers. The preferred of the said drying agents are aqueous solutions of water-soluble salts of the vanadyl ion ($VO^{2+}$), e.g. vanadyl carboxylates, in particular vanadyl oxalate, or vanadyl phosphates.

Although the said drying agents are aimed at applications in water-based ink formulations and do not show any drying effect in common oil-based printing inks, we have now surprisingly found that vanadyl ($VO^{2+}$) salts can under certain conditions nevertheless advantageously replace the cobalt driers in certain types of oil-based printing inks, and that the resulting cobalt-free drier system even outperforms in certain aspects the classical cobalt-manganese based driers.

SUMMARY OF THE INVENTION

We have found that salts of vanadium, preferably four-valent vanadium, in the form of the vanadyl ion ($VO^{2+}$), can be used as an efficient siccativating agent for the oxidative curing of a particular class of oil-based printing inks, which are used, among others, for the copperplate intaglio printing process.

We found that oil-based printing inks can be successfully dried with salts of vanadium, preferably vanadyl salts, if these inks comprise an anionic macromolecular surfactant as disclosed in EP-A 0 340 163 (Amon et al.); the content of which is incorporated herein by reference. The soluble vanadyl salt, which can be vanadyl sulfate, vanadyl oxalate, etc., is hereby added neat or in the form of a water-mixable solution to the printing ink. Alternatively, an equivalent commercial product, such as Borchers® VP 9950, containing vanadyl ions, may be used.

It is essential that the oil-based ink comprises such an anionic macromolecular surfactant. The presence of the vanadium salt alone does not result in any sufficient drying effect.

Alternatively, a siccativating compound can first be made by adding a soluble salt of vanadium, preferably a vanadyl salt, such as vanadyl sulfate, vanadyl oxalate, etc., or an equivalent commercial product containing vanadyl ions, such as Borchers® VP 9950, neat or in the form of a water-mixable solution to the said anionic macromolecular surfactant, and the resulting, vanadyl ion containing siccativating compound, can subsequently be added to the printing ink.

The vanadium compound can also be added to the anionic macromolecular surfactant or to the printing ink in another oxidation state than four (i.e. vanadyl ion; $VO^{2+}$); noteworthy any soluble vanadium compound, having an oxidation state in the range of +II to +V may be used, such as vanadium (V)-oxide ($V_2O_5$), ammonium metavanadate ($NH_4VO_3$), $VCl_2$, $VCl_3$, $VCl_4$ etc.; such forms will eventually convert in situ into the vanadyl ion, by hydrolysis and/or under the influence of reducing agents or of air oxygen, respectively.

Preferably, in addition to the vanadyl ion, at least one further siccativating cation, such as manganese(II) ion ($Mn^{2+}$), is also present in the siccativating agent or in the ink. The said at least one further cation can be added to the anionic macromolecular surfactant or to the printing ink in the very same way as the vanadyl ion.

Calcium and/or zirconium cations, among others, can further be added as co-siccativating cations (secondary siccativating components). The drying speed and efficiency can be further improved through the presence of drying accelerators, such as bipyridine.

The siccativating agent (drier) can be made up in advance as a solution, and added in appropriate amounts to the anionic macromolecular surfactant or to the printing ink at the moment of its formulation. The solvent for making up the siccativating agent is preferably water or a water-thinnable organic solvent.

The printing ink to be siccativated should contain at least one oxidatively curable material. Such materials are known to the skilled person, and they can be of natural or of synthetic origin. Typical oxidatively curable materials of natural origin are linseed oil, tung oil, tall oil and further drying oils having an iodine number of at least 100. Typical oxidatively curable materials of synthetic origin are the alkyd resins. They are typically obtained by the esterification of a mixture comprising one or more polyhydric carboxylic acids or acid derivatives, such as maleic anhydride, (ortho-, iso-, tere-) phthalic acids or anhydrides, and/or their hydrogenated equivalents, etc., and one or more unsaturated fatty acids of natural origin, with one or more polyhydric alcohol, such as ethylene glycol, glycerol, pentaerythritol, sorbitol, etc. The resulting products are, depending on the starting materials and the process conditions, more or less viscous resins, having more or less unsaturated groups and more or less carboxylic acid groups.

Further to the oxidatively curable material, the printing ink to be siccativated according to the present invention must contain an anionic macromolecular surfactant (AMS). Macromolecular surfactants, also referred to as polymeric surfactants, are known to the skilled person (e.g. EP-A 0 798 320; U.S. Pat. No. 5,484,895; WO-A 2004/111165). Depending on the present chemical functionalities, macromolecular surfactants can be anionic, cationic, or non-ionic. Typically, macromolecular surfactants comprise a portion of the polymer molecule which has an affinity for a first phase, e.g. a hydrophobic phase, and a portion of the polymer molecule which has an affinity for a second phase, e.g. a hydrophilic phase. The AMS polymer can be a block copolymer containing a block of hydrophobic repeating monomer units and a block of hydrophilic repeating monomer units. The AMS polymer can also be a graft polymer containing a main polymer or oligomeric backbone, having affinity for a first phase, and pendant polymeric or oligomeric chains, having affinity for a second phase.

A suitable anionic macromolecular surfactant is obtained by neutralization with organic or inorganic bases of at least one the following polymers:

Addition reaction products of fumaric acid or maleic anhydride to unsaturated vegetable oils, adducts of phenolic resins and vegetable oils, or polybutadiene type resins (having acid number comprised between 10 and 250 mg KOH/g of resin), polyamides, polyethers.

Alkyd resins and modified alkyd resins (phenolic, epoxy, urethane, silicone, acrylic or vinylic modified alkyd resins). The acid number is comprised between 10 and 150 mg KOH/g resin.

Epoxy resins and modified epoxy resins carrying carboxylic acid groups. The acid number is comprised between 30 and 200 mg KOH/g resin.

Saturated polyester resins and modified saturated polyester resins (acid number between 50 and 250 mg KOH/g resin).

Polymers and copolymers containing between 2 and 100% of acrylic acid and/or methacrylic acid and/or maleic acid and/or styrene sulphonic acid (acid number between 20 and 150 mg KOG/g resin).

Condensation reaction products of rosin and rosin esters with vegetable oils and/or phenolic type resins.

Anionic type cellulose ethers.

Polymers comprising phosphate and/or phosphonate groups.

The printing ink for the preferred application, i.e. the engraved copperplate (Intaglio) printing process, further contains pigments and/or fillers, as the colouring and viscosity-building agents. Intaglio printing inks are of pasty consistence and have a viscosity of at least 3 Pa·s at 40° C. (shear rate 1000 $s^{-1}$), measured on a Haake Roto-Visco RV1. Pigments and fillers together make up for about 60% of the total weight of the ink, and they constitute an important barrier for oxygen diffusion within the printed ink, slowing down the drying process. Given the thickness of the ink layer (typically 50 micrometers) which is applied through Intaglio printing, the efficiency of the drier system is crucial. Pigments and fillers which can be used in intaglio printing inks are well-known to the skilled man and need no further description here.

Intaglio printing inks further require a wax component to be present in the ink during the printing process. The role of the wax is twofold: first it contributes to reduce the set-off. Secondly, it lubricates the surface of the wiping cylinder during the printing operation, hereby reducing the friction between the wiping cylinder and the printing plate and prolonging the lifetime of the expensive printing plate. Wax components useful in intaglio printing inks are well-known to the skilled man. Examples of suitable wax components are polyethylene wax (such as PE 130 from Hoechst) or Carnauba wax.

The preferred ink of the present invention therefore comprises a wax component, as well as pigments and/or fillers, so as to make up an Intaglio printing ink having a viscosity of at least 3 Pa·s at 40° C. (shear rate 1000 s$^{-1}$), measured on a Haake Roto-Visco RV1. Of course, the inks of the present invention may comprise further additives conventionally used in intaglio printing inks and which are well-known to the skilled man.

The invention further discloses a process of making and using the oxidatively curing intaglio printing ink, as well as a process of making and using the intermediate siccativating compound, containing the anionic macromolecular surfactant and the vanadium drier.

The process for producing an oxidatively curing Intaglio printing ink according to the present invention comprises the step of adding a salt of vanadium, preferably of the vanadyl ($VO^{2+}$) ion, as the oxypolymerisation-inducing siccativating agent to a mixture comprising at least one oxidatively curing material, and at least one anionic macromolecular surfactant, together with a wax component.

The process for producing a siccativating compound according to the present invention comprises the step of adding a salt of vanadium, preferably of the vanadyl ($VO^{2+}$) ion, as the oxypolymerisation-inducing siccativating agent to an anionic macromolecular surfactant in an appropriate solvent. Useful solvents to carry out the process are selected from the group consisting of polar organic solvents, such as tetrahydrofurane (THF) or the like. The solvent can be removed once the reagents are thoroughly mixed. The product formation is visible by the colour change of the reaction mixture from blue to green.

A further process for producing an oxidatively curing printing ink comprises the step of adding a siccativating compound according to the invention to at least one oxidatively curing material, preferably to an alkyd resin.

The siccativating compound according to the invention can be used in an oxidatively curing printing ink, preferably in an engraved copperplate intaglio printing ink. The resulting ink can be used for printing security documents, in particular for banknote printing.

BRIEF DESCRIPTION OF THE DRAWINGS

FIG. 1 schematically illustrates the chemical nature of the vanadium containing siccativating compound of the present invention. The siccativating compound contains vanadium preferably in the (4+) oxidation state (vanadyl ion, $VO^{2+}$), bound to carboxylate groups of the anionic macromolecular surfactant (AMS), in the presence of water molecules. The AMS also may contain fatty acid residues, which may be unsaturated, and which are linked to a polymer backbone.

DETAILED DESCRIPTION OF THE INVENTION

The oxidatively curing printing ink according to the present invention, aimed for use in the engraved copperplate (Intaglio) printing process, comprises, among its macromolecular components, at least one oxidatively curable material and at least one anionic macromolecular surfactant, and is characterized in that a salt of vanadium, preferably of the vanadyl ($VO^{2+}$) ion, is present as the oxypolymerisation-inducing primary siccativating agent. Inks for the said Intaglio printing process must also contain a wax component.

The oxidatively curable material is preferably an alkyd resin, such as obtained by the joint condensation (esterification) at 180° C. to 240° C. of one or more polycarboxylic acids, such as ortho-, iso-, or ter-phthalic acids, ortho-tetrahydrophthalic acid, fumaric acid, maleic acid, or a corresponding anhydride thereof;

one or more polyhydric alcohols, such as glycol, trimethylolethane, pentaerythritol, sorbitol, etc.; and one or more unsaturated fatty acids, such as linseed oil, tung oil or tall oil fatty acids.

Such condensation and the respective conditions to obtain useful products for the purpose of making an ink binder are known to the skilled person. In general, oxidatively curable materials are well-known to the skilled man and do not need to be described in detail here.

A naturally occurring drying oil, such as linseed oil or tung oil, can also be used as the oxidatively curable material.

The anionic macromolecular surfactants to be used in the present invention are well-known to the skilled man. These compounds and methods of preparing them have been described in detail in the patent literature, for example, in EP-0 340 163 A1, the respective content thereof being incorporated herein by reference. Various chemical methods can be used to prepare the anionic macromolecular surfactant; typical chemical methods are given above and in the example part of the present description. These products are generally characterized by a molecular weight of the order of 2000-5000 g/mol and by a high number of carboxylate groups (typical acid number in the protonated state of up to 250 mg KOH/g), so as to result in a complete solubility in basic aqueous solution at low ionic strength (typically in 0.1% to 1% NaOH).

The printing ink may, in addition to the salt of a vanadium cation, comprise a second primary siccativating agent, such as the salt of a cation chosen from the cations of manganese, iron, copper and cerium; preferred is the manganese(II) cation. The presence of additional primary siccativating agents improves the drying speed and the in-depth drying of the ink.

The printing ink may further and advantageously comprise at least one secondary siccativating (co-siccativating) agent, such as the salt of a cation chosen from the cations of calcium, zirconium, strontium, barium, bismuth, zinc and tin; preferred are calcium or zirconium cations. The secondary siccativating agents show no drying effect on their own, but they increase the activity of the primary siccativating agents when used in combination with them.

The printing ink may additionally comprise at least one drying accelerator; preferred is 2,2'-bipyridine.

Instead of directly formulating the vanadium salt into the oxidatively curing printing ink, a siccativating compound can be previously prepared. The siccativating compound comprises at least one anionic macromolecular surfactant, and a salt of vanadium, preferably of the vanadyl ($VO^{2+}$) ion as the oxypolymerisation-inducing component. Said siccativating compound is mixed into an oxidatively curing printing ink in a subsequent step.

The preparation of a siccativating compound containing the vanadium compound and the other siccativating components, and its subsequent introduction into the ink has the advantage of facilitating the homogeneous distribution of the siccativating agent throughout the bulk of the printing ink. It is noteworthy easier to first homogeneously mix the required low volume of siccativating agent with the low-viscosity anionic macromolecular surfactant, and then to mix this larger volume with the rest of the printing ink, rather than to directly mix the low volume of siccativating agent homogeneously with the high volume of the highly viscous printing ink.

We have found that the siccativating activity is a result of the combination of the vanadium cation and the anionic macromolecular surfactant (AMS). For example, Vanadyl sulfate alone does not siccativate a greasy ink which does not contain the anionic macromolecular surfactant. Upon "doping" a greasy ink with the AMS, the siccativating action of the vanadium salt is observed, however.

The formation of a compound between the AMS and the vanadyl cation is also visually apparent; vanadyl sulfate, as well as aqueous solutions of vanadyl salts have a blue color, whereas the compound of the vanadyl cation with the AMS is green. The effect is illustrated by the reflection spectra given in FIG. 2. These spectra were obtained from draw-downs on a white, reflecting background; the intensity values are not to scale.

Figure 2:
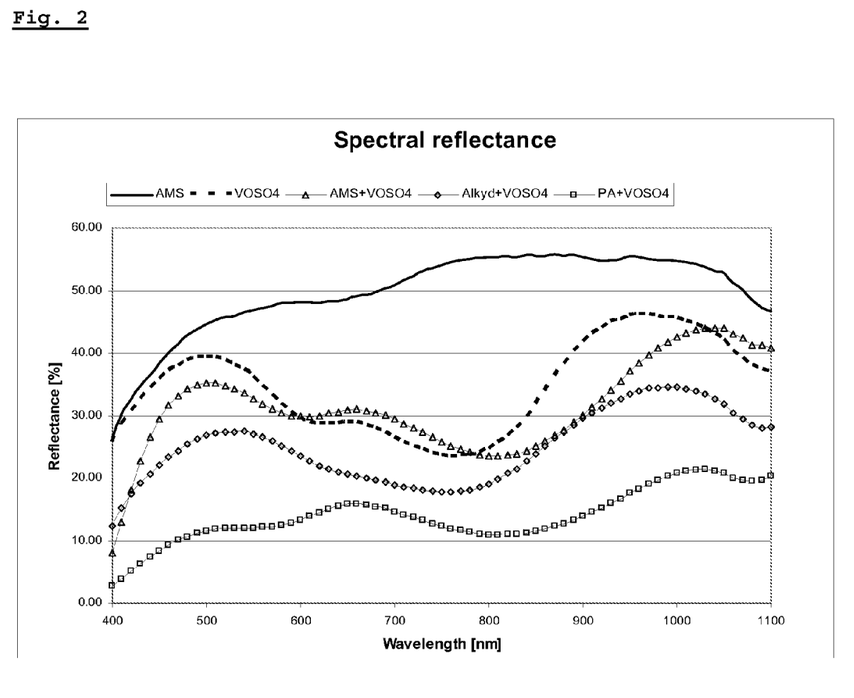
FIG. 2 shows Vis/NIR reflectance spectra (400 to 1100 nm) of:
The anionic macromolecular surfactant (AMS);
the vanadium containing siccativating compound of the present invention, composed of anionic macromolecular surfactant and vanadyl sulfate (AMS-$VOSO_4$);
an alkyd resin doped with vanadyl sulfate (Alkyd-$VOSO_4$);
a polyacrylate resin doped with vanadyl sulfate (PA-$VOSO_4$) hydrated vanadyl sulfate ($VOSO_4$=VO ($SO_4$)* $5H_2O$)

FIG. 2 shows, in addition to the spectra of the AMS (which is about transparent from 400 nm to 1100 nm) and of vanadyl sulfate pentahydrate ($VOSO_4$, which has two absorption peaks at 620 nm and 760 nm), the spectrum of the compound of the AMS with vanadyl sulfate ($AMS+VOSO_4$), which is characterized by an absorption in the ultraviolet (UV) part of the spectrum, below 400 nm, as well as two distinct absorption peaks at 600 nm and at 810 nm. The addition product of an alkyd resin with vanadyl sulfate ($Alkyd+VOSO_4$), which is not effective as a siccativating compound (i.e. wherein the alkyd is not an anionic macromolecular surfactant in accordance with the present invention), shows absorption peaks at 620 nm and at 760 nm, similar to the spectrum of vanadyl sulfate alone. The addition product of polyacrylate resin with vanadyl sulfate ($PA+VOSO_4$) shows absorption peaks at 580 nm and at 820 nm and is also effective as a siccativating compound; polyacrylate resin may indeed serve as an AMS. We tend to associate the said green color and the vanadyl absorption peaks at 600 nm or below and at 800 nm or above with the siccativating action.

Figure 1:
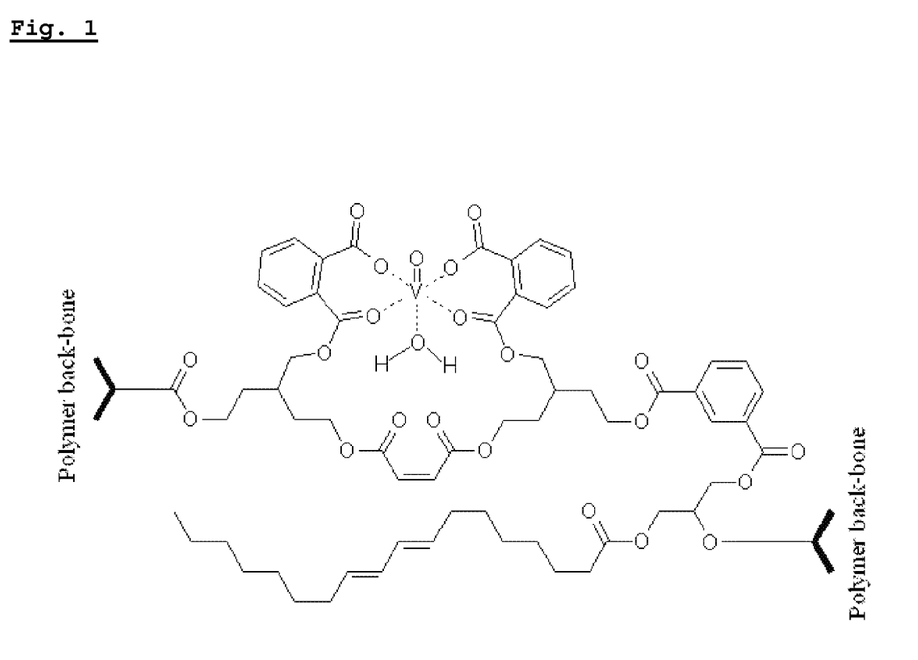

FIG. 1 schematically represents a possible chemical structure of the active siccativating agent as the combination of the following, known to be required elements: a vanadyl cation ($VO^{2+}$), coordinated to carboxylate groups of the AMS polymer so as to obtain charge neutrality, as well as to one or more water molecules so as to obtain a coordination environment of at least six atoms around the vanadium ion. In the drawing, the carboxylate groups are represented by two aromatic carboxylates; they may, however, as is evident from the polyacrylate example, also be aliphatic carboxylates. Further chemical groups may be present in the siccativating agent, such as unsaturated or saturated fatty acid residues.

The siccativating compound may additionally comprise a second primary siccativating agent, such as the salt of a cation selected from the group consisting of the cations of manganese, iron, copper and cerium, preferably the manganese(II) cation. Manganese is known to improve the in-depth drying of Intaglio inks, and is currently used in combination with the cobalt driers.

Furthermore, the siccativating compound may comprise at least one secondary siccativating (co-siccativating) agent, such as the salt of a cation selected from the group consisting of calcium, zirconium, strontium, barium, bismuth, zinc and tin cations, preferably the calcium or zirconium cations. It may further comprise a drying accelerator, preferably 2,2'-bipyridine.

The amount of vanadium in the siccativating agent or compound according to the present invention is in the range of between 2% and 20%.

The amount of the optional further siccativating cation, such as manganese, in the siccativating agent or compound is in the range of between 2% and 20%.

Processes for producing the oxidatively curing printing ink of the invention, as well as for producing the siccativating compound, are given in the examples. These methods are well-known to the skilled man and need no further detailed description here.

The oxidatively curing printing ink according to the invention is particularly suited for making inks for engraved copperplate (Intaglio-) printing process, such as is used for the printing of security documents, in particular of banknotes. Intaglio inks for this latter application have a particular need for a rapid surface drying, in order to allow a high production speed, together with an efficient in-depth drying, to confer circulation resistance to the documents. Intaglio inks on bank notes are applied in a rather thick layer (typically 30 to 50 micrometers), protruding from the paper surface; the printing on banknotes is therefore exposed to mechanical contact and to abrasion.

Upon printing, the ink must thus rapidly dry at the surface, to avoid set-off in the printed stack of sheets. During the hours or days following the printing, the printed ink must efficiently dry in depth, to make the document resistant towards water, solvents and common household chemicals, i.e. fit for circulation.

The invention is now further explained with the aid of exemplary non-limiting embodiments:

EXAMPLES

The following examples illustrate the preparation of various anionic macromolecular surfactants, which can be used to make up the printing ink or the siccativating compound according to the present invention. For the preparation of the siccativating compound, a non-siccativating alkyd is preferably used, to avoid auto-crosslinking problems, which would render the product insoluble.

A. Preparation of Anionic Macromolecular Surfactants (AMS):
1. Anionic Rosin-Modified Phenolic Resin:

60 parts of rosin modified phenolic resin (Robert Kraemer GmbH: Bremapal 2120) were first reacted with 25 parts of raw tung oil at 220° C. for two hours. The product was then dissolved in 15 parts of a mineral oil (boiling range 170-260° C.). The per weight acid number was between 75 and 90 mg KOH/g resin. The average molecular weight, determined by GPC analysis, was 2000 g/mol. The product was neutralized with an aqueous solution of 25% potassium hydroxide to a pH of 8. The final resulting acid value was below 10 mg KOH/g resin.

2. Anionic Acryl-Modified Alkyd Resin:

An alkyd resin containing pentaerythritol (5.0 g), ethylene glycol (10.0 g) and glycerol monoallyl ether (20.0 g) as the polyol components, isophthalic acid (7.0 g) and maleic anhydride (13.0 g) as the polyacid components, and tall oil fatty acid (45.0 g) as the fatty acid component, was prepared by polycondensation at 220° C., to yield a per weight acid number of 10 mg KOH/g. The resulting product was diluted with methyl ethyl ketone to a solids content of 60%. Acrylic acid (7.0 g), butyl methacrylate (10.0 g), and benzoyl peroxide (0.2 g) were then added, and the mixture was heated to 80° C.-120° C. for three hours. The methyl ethyl ketone was removed, and the product was diluted with a high boiling mineral oil (Magie 500) to a solids content of 80%. The final acid value was between 40 and 50 mg KOH/g resin, and the number average molecular weight, determined by GPC analysis, was about 3500 g/mol. The product was neutralized with a 10% aqueous solution of lithium hydroxyde to reach a pH value of 7.5. The final acid value was below 15 mg/g resin.

3. Anionic Alkyd Resin:

A medium length alkyd resin carrying carboxylic groups was synthesized by polycondensation at 220° C. of pentaerythritol (15.0 g), glycerol (8.0 g), phthalic anhydride (16.0 g) and linseed oil fatty acids (61.0 g), to yield an acid number below 10 mg KOH/g resin, followed by further addition of phthalic anhydride (19.0 g) at 150° C., which was allowed to react for one hour to yield a per weight acid number of 60 mg KOH/g resin. The product was then diluted in a high boiling mineral oil (Magie 500) to a solids content of 80%. The number average molecular weight, determined by GPC analysis, was about 3000 g/mol. The product was neutralized with a 20% aqueous solution of lithium hydroxide to a final pH of 8.

4. Non-Siccativating Alkyd:

Pentaerythritol (17 g), stearic acid (35.5 g), glycerine (1 g), tetrahydrophtalic anhydride (1 g) and methylisobutylketone (150 mL) were heated under nitrogen at 155° C. for 3 h 30 min. The water was removed by azeotropic distillation. At that stage the temperature was lowered to 120° C., and tetrahydrophtalic anhydride (59.3 g) was added. After two further hours at 120° C., the methylisobutylketone was distilled off under vacuum. The resulting non-reactive alkyd (96.2 g) had a per weight acid number of 194 mg KOH/g.

B. Preparation of a Macromolecular Vanadyl-Based Siccativating Compound:

The non-siccativating alkyd (50 g) from example A.4 and THF (Tetrahydrofurane, 75 g) were heated to 65° C. A 40% aqueous solution of potassium hydroxide (23.5 g) was added dropwise during 5 min. Vanadyl sulfate pentahydrate (40.8 g) was added and the temperature was maintained at 65° C. for 1 h 45 min. THF and water were then removed by distillation at 55° C. under vacuum. A dark green brittle solid (93 g) was obtained. It was reduced to a powder by grinding.

C. Oxidatively Drying Intaglio Printing Inks:

1. Preparation of Intaglio Inks a. Inks Containing Anionic Macromolecular Surfactant The oxidatively drying intaglio printing inks were prepared by thoroughly mixing all ink components, except the siccativating agent. The resulting paste was ground on a three roll mill in two passes (a first pass at 5 bars pressure, a second pass at 8 bars). The siccativating agent (drier) was added before a third pass on the three roll mill at 5 bars. The ink viscosity was adjusted to about 8 Pa·s at 40° C. (shear rate 1000 s$^{-1}$). The solid content of the resulting ink was of the order of 40%.

| Components | Amount (wt %) |
| --- | --- |
| Anionic Alkyd resin from example A.3 (*) | 195 |
| Vialkyd AR 680 (Surface Specialities) diluted in PKWF 1/3 (Dow) | 135 |
| FN5 phenolic resin (Schenectady Europe) cooked in tung oil and diluted with PKWF 1/3 (Dow) | 60 |
| Carnauba wax | 30 |
| Polyethylene wax PE 130 (Hoechst) | 40 |
| Talc | 15 |
| Special Black 4 (Degussa) | 100 |
| PKWF 6/9 AF (Dow) | 45 |
| Calcium carbonate (chalk) | 355 |
| Siccativating agent (according to Table 1) | 25 |
| Total | 1000 |

(*) Can be replaced with the necessary changes by rosin-modified phenolic resin (example A.1) or by anionic acryl-modified alkyd resin (example A.2).

b. Inks not Containing Anionic Macromolecular Surfactant

The following formulas were prepared according to the procedure described for macromolecular surfactant containing inks.

| Components | Amount (wt %) |
| --- | --- |
| Vialkyd SAL 766 (Surface Specialities) | 165 |
| Low molecular weight sulfonated surfactant | 30 |
| Vialkyd AR 680 (Surface Specialities) diluted with PKWF 1/3 | 135 |
| FN5 phenolic resin cooked in tung oil and diluted with PKWF 1/3 AF | 60 |
| Carnauba wax | 30 |
| Polyethylene wax PE 130 (Hoechst) | 40 |
| Talc | 15 |
| Special Black 4 (Degussa) | 100 |
| PKWF 6/9 AF | 45 |
| Calcium carbonate (chalk) | 355 |
| Siccativating agent (according Table 1) | 25 |
| Total | 1000 |

2. Drying and Resistance Tests

The results of the drying and resistance tests are summarized in Table 1. Inks containing no anionic macromolecular surfactant (AMS) cannot be dried with Vanadyl sulfate as the only siccativating agent, whereas cobalt sulfate shows a drying action under similar circumstances. A medium concentration of the siccativating agent of 0.15%, as calculated on the total weight of the ink, was chosen in this test example.

Inks containing the anionic alkyd resin (from example A.3, above) as the anionic macromolecular surfactant (AMS) can be dried with vanadyl sulfate at the said concentration as the only siccativating agent. The vanadyl compound is even more efficient (shorter drying time) than an equivalent amount of cobalt sulfate or cobalt octoate. Vanadyl oxalate shows an even more rapid drying action.

The most efficient drying agent at low vanadium concentration, studied in the present context, was a mixture comprising 0.02% of $VO^{2+}$, 0.1% of $Mn^{2+}$, and 0.2% of $Zr^{4+}$, as calculated on the total weight of the ink ("New agent"). The drying time of the ink was shorter (29 hours) than that of the same ink having the standard drying agent (comprising 0.02% of $Co^{2+}$, 0.1% of $Mn^{2+}$, and 0.2% of $Zr^{4+}$, as calculated on the total weight of the ink).

Inks dried with the "new agent" showed also excellent performance as to set-off and through-drying, where in both cases best results were obtained (Table 1).

TABLE 1

| Example | AMS | Siccativating agent | Co (%) | V (%) | Mn (%) | Zr (%) | Through-Drying (*) | Set-off () | Drying time (*) (h) |
|---|---|---|---|---|---|---|---|---|---|
| C.1.a | Anionic Alkyd resin (ex. A.3) | No | 0 | 0 | 0 | 0 | 1 | 1 | >240 |
| | | Cobalt sulfate | 0.15 | 0 | 0 | 0 | 3.5 | 4 | 30 |
| | | Cobalt octoate[1] | 0.15 | 0 | 0 | 0 | 3.5 | 4 | 47 |
| | | Vanadyl sulfate | 0 | 0.15 | 0 | 0 | 4.5 | 5 | 22 |
| | | Vanadyl oxalate | 0 | 0.15 | 0 | 0 | 4.5 | 5 | 16 |
| | | Standard agent Co[1]/Mn[2]/Zr[3] | 0.02 | 0 | 0.1 | 0.2 | 2.5 | 4 | 40 |
| | | New agent V[4]/Mn[2]/Zr[3] | 0 | 0.02 | 0.1 | 0.2 | 5 | 4.5 | 29 |
| C.1.b | no | Cobalt sulfate | 0.15 | 0 | 0 | 0 | 4 | 2.5 | 50 |
| | no | Vanadyl sulfate | 0 | 0.15 | 0 | 0 | 2.5 | 2 | 220 |

Borchers Octasoligen Cobalt
Borchers Octasoligen Manganese
Borchers Octasoligen Zirconium
$VOSO_4 \cdot 5H_2O$ aqueous solution 6% in vanadium
(*) Through-drying ratings were determined by the counter-pressure method 24 hours after printing; the values are attributed as follows:
1: no through-drying
2: bad through-drying
3: medium through-drying
4: good through-drying
5: complete through-drying
The tolerable limit for the through-drying at 24 hours is 3 to 4
(**) Set-off ratings were determined 24 hours after printing; the values are attributed as follows:
1: complete set-off ('full copy')
2: strong set-off
3: medium set-off
4: slight set-off
5: no set-off
The tolerable limit for the set-off at 24 hours is 4.5.
(***) Drying times were determined on a BK drying time recorder, using imprinted glass strips with travelling needles, conform to ASTM D 5895, as known to the skilled person.

The invention claimed is:

1. Oxidatively curing oil-based printing ink composition for the engraved copper-plate intaglio printing process, comprising:
a vanadyl ($VO^{2+}$) ion bound to an anionic macromolecular surfactant (AMS), wherein the AMS comprises at least two acid groups separated by at least one conjugated double bond;
at least one oxidatively curable material;
at least one wax component; and
at least one pigment or filler,
wherein said ink composition has a total viscosity of at least 3 Pa·s at 40° C. and a shear rate of $1000\ s^{-1}$.

2. The oxidatively curing oil-based printing ink composition according to claim 1, wherein said at least one oxidatively curable material is an alkyd resin.

3. The oxidatively curing oil-based printing ink composition according to claim 1, wherein said ink composition additionally comprises at least one salt selected from the group consisting of the salts of cations of manganese, iron, copper and cerium.

4. The oxidatively curing oil-based printing ink composition according to claim 3, wherein said salt is a salt of the manganese (II) cation.

5. The oxidatively curing oil-based printing ink composition according to claim 1, wherein said ink composition additionally comprises at least one co-siccativating cation selected from the group consisting of calcium, zirconium, strontium, barium, bismuth, zinc and tin cations.

6. The oxidatively curing oil-based printing ink composition according to claim 5, wherein said co-siccativating cation is selected from the group consisting of the calcium and the zirconium cation.

7. The oxidatively curing oil-based printing ink composition according to claim 1, wherein said ink composition additionally comprises at least one drying accelerator.

8. The oxidatively curing oil-based printing ink composition according to claim 1, wherein the acid groups are carboxylate groups.

9. The oxidatively curing oil-based printing ink composition according to claim 8, wherein the vanadyl ($VO^{2+}$) ion is bound to the carboxylate groups of the AMS.

10. The oxidatively curing oil-based printing ink composition according to claim 1, wherein the vanadyl-AMS compound has a green color.

11. The oxidatively curing oil-based printing ink composition according to claim 1, wherein the AMS comprises aromatic carboxylates.

12. The oxidatively curing oil-based printing ink composition according to claim 1, wherein the AMS comprises aliphatic carboxylates.

13. The oxidatively curing oil-based printing ink composition according to claim 1, wherein the AMS has a molecular weight of 2000-5000 g/mol.

14. Siccativating compound for use in an oxidatively curing printing ink, comprising at least one anionic macromolecular surfactant (AMS), and a vanadyl ($VO^{2+}$) ion bound to the AMS, wherein the AMS comprises at least two acid groups separated by at least one conjugated double bond.

15. Siccativating compound according to claim 14, wherein said compound additionally comprises at least one salt selected from the group consisting of the salts of cations of manganese, iron, copper and cerium.

16. Siccativating compound according to claim 15, wherein said salt is a salt of the manganese (II) cation.

17. Siccativating compound according to claim 14, wherein said compound additionally comprises at least one salt of a co-siccativating cation selected from the group consisting of calcium, zirconium, strontium, barium, bismuth, zinc and tin cations.

18. Siccativating compound according to claim 17, wherein said co-siccativating cation is selected from the group consisting of the calcium and the zirconium cation.

19. Siccativating compound according to claim 14, wherein said compound additionally comprises at least one drying accelerator.

20. Process for producing an oxidatively curing printing ink, comprising adding a siccativating compound according to claim 14 to at least one oxidatively curable material.

21. Process according to claim 20, wherein said oxidatively curable material is an alkyd resin.

22. Process for producing an oxidatively curing oil-based printing ink composition for the engraved copperplate intaglio printing process, comprising:
adding together a vanadyl ($VO^{2+}$) ion, an anionic macromolecular surfactant (AMS) comprising at least two acid groups separated by at least one conjugated double bond, at least one oxidatively curable material, at least one wax component, and at least one pigment or filler to form a composition having a total viscosity of at least 3 Pa·s at 40° C. and a shear rate of $1000\ s^{-1}$.

23. Process for producing a siccativating compound, comprising adding a vanadyl ($VO^{2+}$) ion as the oxypolymerisation-inducing siccativating agent to at least one anionic macromolecular surfactant, wherein the AMS comprises at least two acid groups separated by at least one conjugated double bond.

24. Method of printing a security document, comprising applying an oxidatively curing printing ink composition according to claim 1 to said security document.

25. Method according to claim 24, wherein said security document is a banknote.

* * * * *

UNITED STATES PATENT AND TRADEMARK OFFICE
CERTIFICATE OF CORRECTION

| | | |
|---|---|---|
| PATENT NO. | : 8,807,036 B2 | Page 1 of 1 |
| APPLICATION NO. | : 12/663570 | |
| DATED | : August 19, 2014 | |
| INVENTOR(S) | : Lefebvre et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this
Eleventh Day of August, 2015

Michelle K. Lee
*Director of the United States Patent and Trademark Office*